(12) United States Patent
Psiaki

(10) Patent No.: US 8,712,051 B2
(45) Date of Patent: Apr. 29, 2014

(54) SPOOFING DETECTION FOR CIVILIAN GNSS SIGNALS

(75) Inventor: Mark L. Psiaki, Brooktondale, NY (US)

(73) Assignee: Cornell University, Ithaca, NY (US)

( * ) Notice: Subject to any disclaimer, the term of this patent is extended or adjusted under 35 U.S.C. 154(b) by 65 days.

(21) Appl. No.: 13/255,984

(22) PCT Filed: Mar. 12, 2010

(86) PCT No.: PCT/US2010/027106
§ 371 (c)(1),
(2), (4) Date: Sep. 22, 2011

(87) PCT Pub. No.: WO2010/105136
PCT Pub. Date: Sep. 16, 2010

(65) Prior Publication Data
US 2012/0121087 A1    May 17, 2012

Related U.S. Application Data

(60) Provisional application No. 61/159,937, filed on Mar. 13, 2009.

(51) Int. Cl.
*H04L 29/06* (2006.01)
(52) U.S. Cl.
USPC .......................................... 380/255
(58) Field of Classification Search
None
See application file for complete search history.

(56) References Cited

U.S. PATENT DOCUMENTS

| 4,972,431 | A | 11/1990 | Keegan |
| 5,134,407 | A | 7/1992 | Lorenz |
| 5,754,657 | A | 5/1998 | Schipper et al. |
| 5,825,887 | A | 10/1998 | Lennen |
| 5,995,042 | A | 11/1999 | Durboraw, III et al. |
| 6,040,798 | A | 3/2000 | Kinal et al. |
| 6,104,815 | A * | 8/2000 | Alcorn et al. ............... 380/251 |
| 6,125,135 | A | 9/2000 | Woo et al. |
| 7,250,903 | B1 | 7/2007 | McDowell |
| 7,383,577 | B2 | 6/2008 | Hrastar et al. |
| 7,400,292 | B2 | 7/2008 | DeLellio |
| 7,480,568 | B2 | 1/2009 | Dentinger et al. |

(Continued)

FOREIGN PATENT DOCUMENTS

EP    1489432 A1    12/2004

OTHER PUBLICATIONS

International Search Report dated Oct. 25, 2010 for PCT/US10/27106.
Written Opinion dated Oct. 25, 2010 for PCT/US10/27106.

(Continued)

*Primary Examiner* — Benjamin Lanier
*Assistant Examiner* — Simon Kanaan
(74) *Attorney, Agent, or Firm* — Burns & Levinson LLP; Jacob N. Erlich; Orlando Lopez

(57) ABSTRACT

A system and method for detecting spoofing of signals by processing intermittent bursts of encrypted Global Navigation Satellite System (GNSS) signals in order to determine whether unencrypted signals are being spoofed. The system and method can allow a specially equipped GNSS receiver to detect sophisticated spoofing that cannot he detected using receiver antonomous integrity monitoring techniques. The system and method do not require changes to the signal structure of encrypted civilian GNSS signals, but instead use a short segment of an encrypted signal that is broadcast by the same GNSS spacecraft which broadcast the unencrypted signal of interest.

20 Claims, 5 Drawing Sheets

(56) References Cited

U.S. PATENT DOCUMENTS

| | | | |
|---|---|---|---|
| 7,623,068 B2 | 11/2009 | Powell et al. | |
| 2001/0020216 A1* | 9/2001 | Lin | 701/216 |
| 2005/0146459 A1 | 7/2005 | Dentinger et al. | |
| 2007/0106472 A1* | 5/2007 | Dentinger et al. | 701/213 |
| 2007/0194984 A1 | 8/2007 | Waid | |
| 2009/0135054 A1 | 5/2009 | Dentinger et al. | |
| 2009/0195354 A1 | 8/2009 | Levin et al. | |
| 2009/0195443 A1 | 8/2009 | Levin et al. | |
| 2010/0195829 A1* | 8/2010 | Blom et al. | 380/255 |

OTHER PUBLICATIONS

Psiaki, M. L. et al. Design and Practical Implementation of Multifrequency RF Front Ends Using Direct RF Sampling. IEEE Trans. Microwave Theory and Techn. 53(10), Oct. 2005: 3082-3089.

Montenbruck, O. et al. GIOVE-A initial signal analysis. GPS Solut (2006) 10: 146-153.

Lo, S. et al. Signal Authentication: A Secure Civial GNSS for Today. InsideGNSS Sep./Oct. 2009: 30-39.

Scott, L. Expert Advice—Location Assurance. GPS World Online, Jul. 1, 2007: 1-8.

Navstar Global Positioning System, Interface Specification IS-GPS-200, Revision D, Dec. 7, 2004: 1-193.

Hein, G.W. et al. Status of Galileo Frequency and Signal Design. Proc. 15th International Technical Meeting of the Satellite Division of the Institute of Navigation (ION GPS 2002), Sep. 24 -27, 2002: 266 -277.

Humphreys, T.E. et al. Assessing the Spoofing Threat: Development of a Portable GPS Civilian Spoofer. Preprint of the 2008 ION GNSS Conference, Savannah, GA, Sep. 16-19, 2008: 1-12.

International Preliminary Report on Patentability dated Sep. 22, 2011 for PCT/US10/27106.

* cited by examiner

SPOOFING DETECTION FOR CIVILIAN GNSS SIGNALS

CROSS REFERENCE TO RELATED APPLICATIONS

This application is the U.S. national phase entry under 35 U.S.C. §371 of International Patent Application No. PCT/US10/27106 filed Mar. 12, 2010, entitled SPOOFING DETECTION FOR CIVILIAN GNSS SIGNALS, which in turn claims priority from U.S. Provisional Application Ser. No. 61/159,937, filed Mar. 13, 2009, entitled SPOOFING DETECTION FOR CIVILIAN GNSS SIGNALS VIA AIDING FROM ENCRYPTED SIGNALS, both of which are incorporated herein by reference herein in their entirety for all purposes.

BACKGROUND

The system and method of the present embodiment relate generally to spoofing detection of unencrypted civilian Global Navigation Satellite System (GNSS) signals.

The vulnerability of unencrypted civilian GNSS signals to spoofing has been known. Spoofing is the intentional broadcast of signals that appear to user equipment (UE) to be true signals, but are actually false signals. Spoofing of GNSS signals can, for example, cause a user receiver to determine that it occupies a different location than its true location, or to determine erroneous corrections to its receiver clock time. Encrypted signals, such as the U.S. Military's Global Positioning System (GPS) P(Y) and M codes, cannot be spoofed because these signals' pseudo-random number (PRN) spreading codes are encrypted; they are not known a priori. A military receiver has access to these PRN codes and uses them to separate the true signal from all other signals in the GPS spectrum. A spoofer cannot know these codes in advance. Therefore, a spoofer cannot broadcast a signal that a military receiver's PRN-code-based signal processing algorithms will mistake for the true signal.

Unencrypted civilian signals, on the other hand, are well known to anyone who has the relevant publicly available document, for example, for GPS signals, Nastar Global Positioning System Interface Specification (IS-GPS-200 Revision D, IRN-200D-001, ARINC Engineering Services, El Segundo, Calif., March 2006) (IS). Similar documents are being produced for the open-source civilian signals of the European Union's Galileo system, which is under development. The information contained in the IS can be used to produce a false unencrypted signal that is capable of spoofing a GNSS receiver. It is also possible to spoof a civilian GNSS receiver in a way that leaves no telltale signs.

What is needed is a system and method to detect spoofing attacks on unencrypted GNSS signals by considering short segments of accompanying encrypted signals. The GPS and the Galileo system both broadcast encrypted and unencrypted signals. For example, the GPS L1 signal, at 1575.42 MHz, includes the unencrypted Coarse Acquisition C/A code and the encrypted Precise P(Y) code, with the two signals modulated in phase quadrature. This known phase relationship is exploited by dual-frequency civilian GPS receivers that do semi-codeless P(Y) processing of signals at the L1 and L2 frequencies. Similarly, the Galileo E1 signal, also at a carrier frequency of 1575.42 MHz, includes the unencrypted E1B and E1C signals along with the encrypted E1A signal. The encrypted signal is generated in quadrature to the other two signals.

What is further needed is a UE that can intermittently process short segments of the encrypted signals and compare them to their known PRN codes, even if the encrypted signals are not known to the UE at the time that the given signal segments arrive. What is still further needed is pre-processing of each signal segment by the user receiver in a way that enables it to efficiently perform an after-the-fact comparison with the encrypted signal's properties. This pre-processing can be enabled by the known phase relationship of the encrypted signal to the unencrypted signal because the unencrypted signal can be tracked by the receiver. Further efficiencies in the pre-processing can be had if additional information is known about the encrypted signals, such as the W-bit timing of the GPS P(Y) code or the binary-offset-carrier (BOC) phase of the GPS M code or the Galileo E1A code.

SUMMARY

The needs set forth above as well as further and other needs and advantages are addressed by the embodiments set forth below.

The present embodiment provides a system and method for processing intermittent bursts of encrypted Global Navigation Satellite System (GNSS) signals in order to determine whether unencrypted signals are being spoofed. The system and method can allow a specially equipped GNSS receiver to detect sophisticated spoofing that cannot be detected using receiver autonomous integrity monitoring techniques. The system and method do not require changes to the signal structure of unencrypted civilian GNSS signals, but instead use a short segment of an encrypted signal that is broadcast by the same GNSS spacecraft which broadcast the unencrypted signal of interest. The receiver's tracking loops that maintain lock on the unencrypted signal can be used to deduce and record features of a segment of the encrypted signal, as in semi-codeless tracking of the GPS military P(Y) code in a civilian receiver. The truth values for these features, or very good estimates of them, can be determined by a high-gain ground-based antenna that is part of an infrastructure which supports this spoofing detection system. Alternatively, these features can be provided directly by the operator of the GNSS service. These feature truth values can be broadcast over a radio link, substantially similar to one that broadcasts Wide-Area Augmentation System (WAAS) data. The user receiver can combine the truth values with its own estimates of the encrypted signal features in order to compute a detection statistic which can be compared to a threshold. If the statistic fails to indicate the presence of the true encrypted signal, then this failure indicates that the unencrypted signal has been spoofed. There can be a time lag in the determination of whether the signal has been spoofed. This lag can be caused partly by the high-gain-antenna/signal-processing infrastructure that determines the truth features of the encrypted signal segment and partly by the transmission delay from the infrastructure to the user equipment (UE).

The system and method of the present embodiment can include a UE that intermittently processes short segments of the encrypted signals and compares them to their known PRN codes. The user receiver can pre-process each signal segment in a way that enables it to efficiently perform an after-the-fact comparison with the encrypted signal's properties. This pre-processing can be enabled by the known phase relationship of the encrypted signal to the unencrypted signal because the unencrypted signal is being tracked by the receiver. Further efficiencies in the pre-processing can be had if additional information is known about the encrypted signals, such as the W-bit timing of the GPS P(Y) code or the binary-offset-carrier (BOC) phase of the GPS M code or the Galileo E1A code.

The UE can access the true characteristics of the segments of the encrypted signal that it pre-processes. This access may not be available in real-time because the receiver may not have authorization to access the necessary information. Therefore, the needed access can be provided in post-processing. The required features of a segment of any encrypted signal can be determined by monitoring the segment using, for example, a ground station that employs a high-gain antenna. If the gain is high enough, then any desired signal feature can be read directly from the antenna output after rudimentary signal processing or estimated to a sufficient degree of accuracy. This information can be transmitted from the ground station to the user receiver via a radio link. This link can be a WAAS-type link in which the ground station first sends the information about the encrypted signal to a geosynchronous Earth orbiting (GEO) relay satellite. This relay satellite can then broadcast the information, and the UE can receive it via a separate radio link. This information can be digitally signed using a private-key/public-key system in order to avoid the possibility that a sophisticated spoofer could spoof the aiding signal of this spoofing detection system and thereby defeat it. For a UE in a fixed location, perhaps one that uses GNSS signals to provide precise timing at a power station or a financial institution, the required information about segments of the encrypted signal could be sent to the UE via an internet link.

The user receiver can combine its preprocessed information about a given segment of the encrypted signal with the truth information in order to determine whether or not its unencrypted signal has been spoofed. This part of the processing can be accomplished by a mixer followed by an integrate-and-dump operation. The resulting detection statistic can be compared to a threshold value. For example, if the detection statistic is above the threshold, then the receiver can deduce that the true encrypted signal was present in the data and, therefore, that the unencrypted signal has not been spoofed. Otherwise, the user receiver can conclude that the unencrypted signal has been spoofed.

For a better understanding of the present embodiments, together with other and further objects thereof, reference is made to the accompanying drawings and detailed description.

DETAILED DESCRIPTION

The present embodiment is now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

Figure 1:
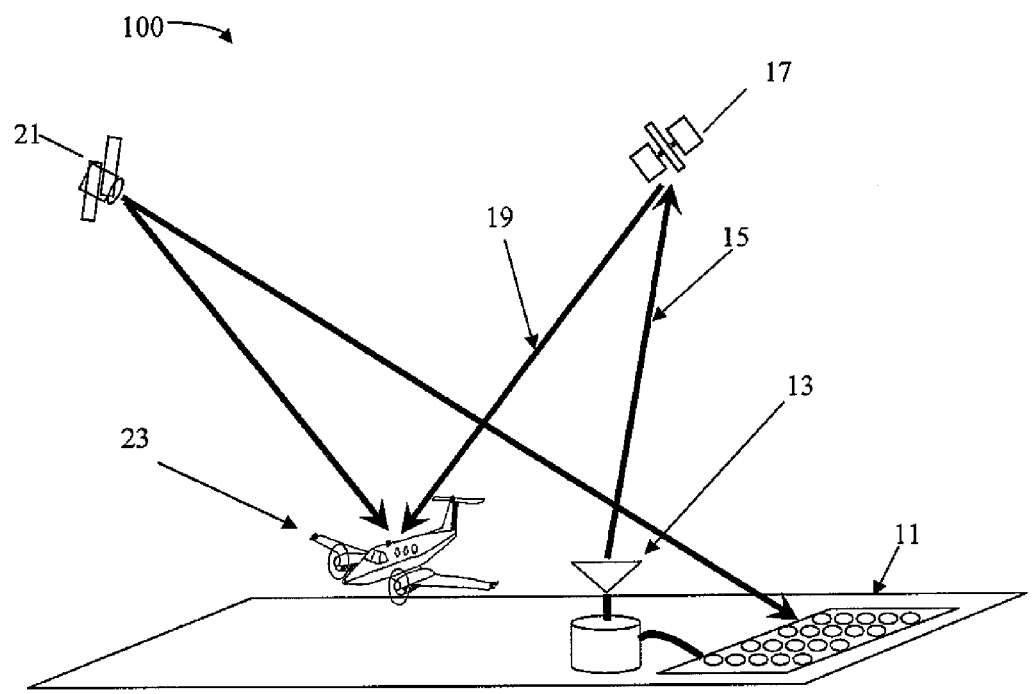
FIG. 1 is a schematic block diagram of an exemplary architecture of the system of the present embodiment that uses GPS L1 P(Y) code to detect spoofing on GPS L1 C/A code.

Referring now to FIG. 1, the depicted exemplary embodiment of system 100 uses the encrypted military P(Y) signal on the GPS L1 frequency in order to enable a user receiver to detect spoofing of the L1 C/A signal. System 100 can include, but is not limited to including, antenna 11 with processing to estimate true W-bits, transmitter 13 of delayed, digitally-signed W-bits over secure uplink 15, GEO "bent-pipe" transceiver 17, broadcast segments 19 of delayed, digitally-signed W-bits, GPS Satellite 21, and UE 23 having a receiver for delayed, digitally-signed W-bits, and semi-codeless P(Y) processing for delayed W-bits detection.

Figure 2:
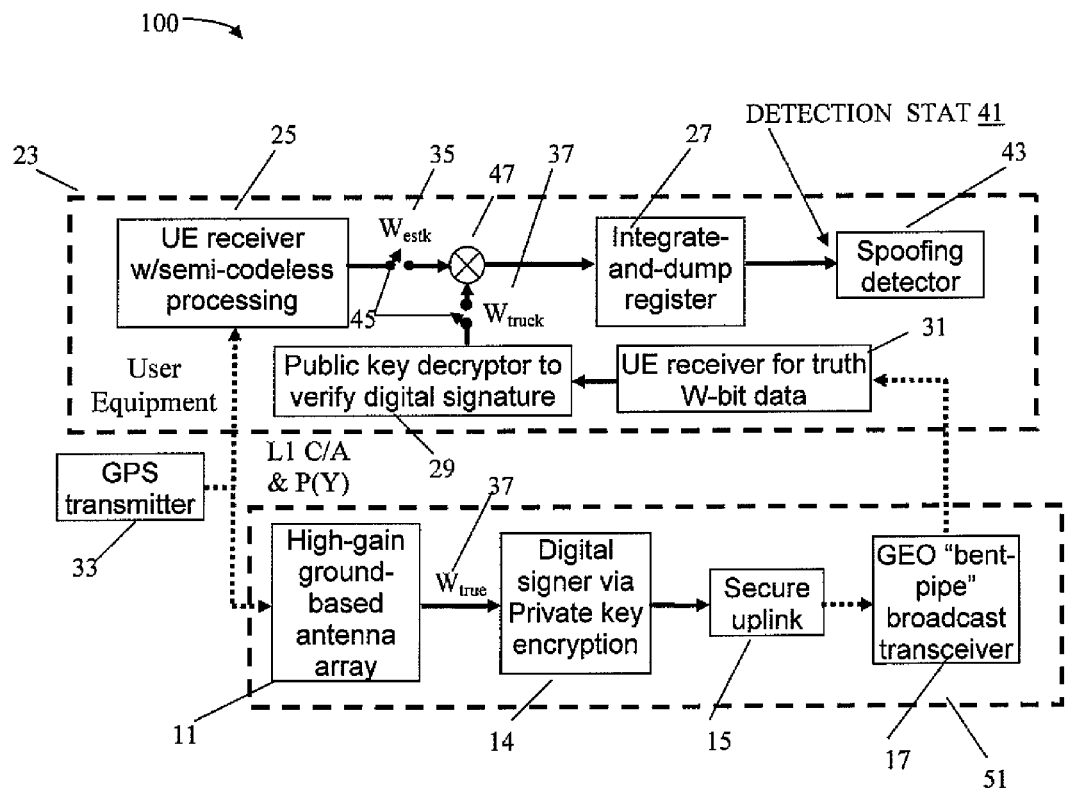
FIG. 2 is a schematic block diagram of the signal processing associated with the embodiment depicted in FIG. 1.

Referring now to FIG. 2, system 100 of the present teachings for detecting spoofing of signals can include, but is not limited to including, receiver 25 receiving encrypted and unencrypted signals. Receiver 25 can estimate a segment of signal characteristics from the received encrypted signal. System 100 can further include antenna 11, which could be, for example, ground-based, receiving encrypted and unencrypted signals. Antenna 11 can extract a segment of true characteristic features from the received encrypted signal. System 100 can still further include digital signer 14 authenticating the segment with private key encryption, secure uplink means 15 transmitting the authenticated segment, GEO broadcast transceiver 17 re-broadcasting the authenticated segment to UE, truth data receiver 31 receiving the encrypted segment, public key decrypter 29 verifying the authenticity of the received truth values of the encrypted segment, mixer 47 mixing the authenticated true characteristic features with the estimated characteristic features, integrate-and-dump register 27 calculating detection statistic 41 from the mixed characteristic features, and spoofing detector 43 comparing detection statistic 41 with a threshold to detect spoofing of the received signal. Characteristic features can optionally include W-bits of the GPS P(Y) code, GPS M code chips, or Galileo E1A code chips. The unencrypted signal can optionally include a GPS C/A code on the L1 frequency, Galileo E1B and E1C codes on the L1 frequency, or GPS L2 CL code on the L2 frequency. The encrypted signal can optionally include a GPS P(Y) code on the L1 frequency, GPS P(Y) code on the L2 frequency, GPS M code on the L1 frequency, GPS M code on the L2 frequency, or Galileo E1A code on the L1 frequency.

Continuing to refer to FIG. 2, in which radio links are denoted by dotted lines, UE 23 is depicted as being carried aboard the aircraft of FIG. 1. UE 23 can include, but is not limited to including, a standard GPS receiver 25 that receives the GPS civilian C/A signal on L1 from GPS transmitter 33. UE 23 can be configured to perform standard semi-codeless processing of the P(Y) signal on the L1 frequency, as described in U.S. Pat. No. 5,134,407, Lorenz, R. G., Helkey, R. J., and Abadi, K. K., "Global Positioning System Receiver Digital Processing Technique", issued July 1992 ('407). UE 23 can perform part of the process described in '407, "soft" W-bit estimation computing $W_{estk}$ 35. Antenna 11 can be used to detect the W encryption bits that change the unencrypted P signal into the encrypted P(Y) signal. If the gain of antenna 11 is high enough, then it can be possible to read these encryption bits directly after base-band mixing and mixing with a P code replica. The use of a phased-array for antenna 11 can allow its high gain to be simultaneously steerable in multiple directions via signal processing so that the W bits from multiple GPS satellites can be determined by a single high-gain array. It is allowable for the array gain to be low enough that the W-bits or similar encrypted signal features are not determined exactly, but are estimated with some uncertainty. Imperfect estimation can require a longer integration time to compute the spoofing detection statistic in integrate-and-dump register 27. After determination by antenna 11, true W bits $W_{truek}$ 37 can undergo private-key encryption in order to digitally sign them, transmission to the UE via GEO transceiver 17, and public-key decryption by public key descriptor 29 in order to authenticate their digital signature. $W_{truek}$ 37 can be mixed with $W_{estk}$ 35 that have previously been generated by the semi-codeless processing. Summation of segments of this mixed signal in integrate-and-dump register 27 can provide detection statistic 41 that can determine whether the true P(Y) signal is present.

Continuing to refer to FIG. 2, GPS satellite L1 C/A and P(Y) signals, from GPS transmitter 33 are received by UE 23 and by antenna 11, which may be, for example, a phased array antenna having high gain. Antenna 11, digital signer 14, secure uplink 15, and GEO transceiver 17, together determine and transmit $W_{truek}$ 37 to UE receiver 31 and public key decrypter 29 via radio link. $W_{truek}$ 37 are mixed with the UE's semi-codeless $W_{estk}$ 35 and summed in integrate-and-dump register 27. Detection statistic 41 is compared to a threshold value in spoofing detector 43 to determine whether or not the true P(Y) signal was present in the received signal. Switches 45 upstream of mixer 47 indicate that mixer 47 and integrate-and-dump register 27 operate intermittently; system 100 can process intermittent segments of P(Y) code.

Continuing to still further refer to FIG. 2, UE GPS receiver 25 can process about a 20 MHz bandwidth about L1. UE receiver 31 can receive signals at a second frequency that can carry the broadcasts of the delayed, digitally-signed segments of W-code truth values. Alternatively, these digitally-signed segments could be transmitted on a pseudo-GPS signal, for example, substantially similar to the WAAS signal. Alternatively, these digitally-signed segments could be transmitted via the internet to a UE 23 that does not move, such as UE in a power plant or a financial institution. To cover the earth, at least three antennas 11 can be used. In an alternate embodiment, short segments of $W_{truek}$ 37 could be transmitted after being supplied by the U.S. military with, for example, a 0.5 second delay or any sufficient delay that would preclude their being used to spoof military P(Y) code receivers. This latter embodiment would not need antenna 11.

Continuing to refer to FIG. 2, in system 100 the encrypted P(Y) signal has a known phase relationship to the C/A signal. The encryption can ensure that no spoofer can generate a spoofed P(Y) segment that will pass a test performed in spoofing detector 43. The phase relationship can ensure that the test will be passed only if the C/A signal is not being spoofed. Spoofing-induced errors in the C/A signal's carrier phase or PRN code phase would destroy the relationship between the semi-codeless receiver's P code replica and the true received P(Y) code. Without this relationship, the spoofed receiver's "soft" $W_{estk}$ 35 would be wrong, a computed detection statistic would fail to pass the test, and spoofing detector 43 would detect the presence of a spoofing signal.

Spoofing detector 43 executes a method that is based on the following model of the GPS L1 signal:

$$y(t_j) = A_C C[t_j - \tau(t_j)] D[t_j - \tau(t_j)] \cos[\omega_{L1} t_j - \phi(t_j)] - A_P P[t_j - \tau(t_j)] W[t_j - \tau(t_j)] D[t_j - \tau(t_j)] \sin[\omega_{L1} t_j - \phi(t_j)] + n(t_j) \quad (1)$$

where $y(t_j)$ is the received signal at receiver clock sample time $t_j$, $A_C$ and $A_P$ are the amplitudes, respectively, of the C/A and P(Y) code signals, C[ ] is the known C/A PRN code, which has a nominal chipping rate of 1.023 MHz, P[ ] is the known P PRN code, which has a nominal chipping rate of 10.23 MHz, D[ ] is the navigation data bit signal, which has a nominal 50 Hz bit rate, W[ ] is the unknown encryption bit sequence, which has an average chipping rate of 480 KHz, $\tau(t_j)$ is the code pseudorange delay at sample time $t_j$, $\omega_{L1} = 2\pi \times 1575.42 \times 10^6$ rad/sec is the nominal L1 carrier frequency, $\phi(t_j)$ is the beat carrier phase at sample time $t_j$, and $n(t_j)$ is the receiver noise at sample time $t_j$. The PRN code time histories C[ ] and P[ ], the navigation data bit time history D[ ], and the encryption bit time history W[ ] all take on the values +1/−1 for their code chips, data bits, or encryption bits, and they all have known code phase relationships between the times when their chip/bit sign transitions can occur.

The noise $n(t_j)$ is sampled from a zero-mean Gaussian white (or nearly white) noise sequence with a standard deviation of $\sigma_n$. This standard deviation is normally a function of the RF front-end design and automatic gain control of UE receiver 25. This noise standard deviation is normally known. The P(Y) amplitude $A_P$, the noise standard deviation $\sigma_n$, and the sample period $\Delta t = t_{j+1} - t_j$ combine to yield the standard carrier-to-noise ratio (carrier power divided by one-sided noise power spectral density) $C/N_0 = A_P^2/(4\sigma_n^2 \Delta t)$.

The model in Eq. (1) can be used to estimate the unknown values of the W bits. For example, a delay-lock loop (DLL) can be run on the C/A code in order to estimate the code pseudorange delay $\tau(t_j)$. Simultaneously, a phase-lock loop (PLL) can be run on the C/A code in order to estimate the beat carrier phase $\phi(t_j)$. The DLL and PLL can be implemented by conventional techniques. The PLL can allow determination of the navigation data bit sequence $D[t_j - \tau(t_j)]$. The usual $\pi$ radians phase ambiguity in $\phi(t_j)$ and the accompanying sign ambiguity in $D[t_j - \tau(t_j)]$ can be resolved by first applying standard bit-lock/frame-lock techniques. The outputs of a frame-lock analysis can be used to resolve the sign ambiguity in the $D[t_j - \tau(t_j)]$ data bits.

The accurate estimates of $\tau(t_j)$, $\phi(t_j)$, and $D[t_j - \tau(t_j)]$ from C/A code tracking can be combined with a replica of the known P[ ] code and with knowledge of the W[ ] bit transition timing in order to form estimates of the W bits. The W[ ] bit timing is directly linked to that of the X1A code, which is a generator code that is used to form the known P[ ] code. The X1A code chips at 10.23 MHz and repeats every 4092 chips, i.e., every 400 μsec. Each chip interval of the X1A code is aligned with a chip interval of the P[ ] code. Every 4092 chips of X1A code is broken down into L equal sets of chip periods. Each of these 4092/L chip periods is broken down into M W-bit periods of duration I P-code chips followed by N W-bit periods of duration JP-code chips. Thus, L(IM+JN)=4092. The two durations of the W bits, I and J, are about 20 P chips and the average W bit rate [L(M+N)/4092]×10230 KHz=480 KHz.

Given the necessary information, the following analysis can be used to form "soft" W bit estimates. In this analysis, the known nominal start and stop times of a given W bit, the $k^{th}$ bit, are $t_{Wk}$ and $t_{Wk+1}$ when measured relative to the nominal C/A and P code timing, and the received signal samples that lie in this known interval are samples $j_{kmin}$ to $j_{kmax}$. In other words, $j_{kmin}$ and $j_{kmax}$ are chosen such that $$t_{j_{kmin}-1} - \tau(t_{j_{kmin}-1}) < t_{Wk} \le t_{j_{kmin}} - \tau(t_{j_{kmin}}) \quad (2a)$$

$$t_{j_{kmax}} - \tau(t_{j_{kmax}}) < t_{Wk+1} \le t_{j_{kmax}+1} - \tau(t_{j_{kmax}+1}) \quad (2b)$$

Note that $\Delta t_{Wk} = t_{Wk+1} - t_{Wk}$ is the duration of the $k^{th}$ W-bit interval, which is in the range 2.083±0.13 μsec. The unnormalized "soft" estimate of $W_k$ is:

$$W_{estk} = -D_k \sum_{j=j_{kmin}}^{j_{kmax}} y(t_j) P[t_j - \tau(t_j)] \sin[\omega_{L1} t_j - \phi(t_j)] \quad (3)$$

where the time histories $P[t_j-\tau(t_j)]$ and $\sin[\omega_{L1}t_j-\phi(t_j)]$ are reconstructions based on the C/A code DLL and PLL outputs, and $D_k$ is the navigation data bit value, which is constant over any given W-bit interval. This estimate is called un-normalized because the P(Y) signal amplitude $A_P$ has not been removed from the estimate nor has the effect of the number of samples, $N_k=j_{kmax}-j_{kmin}+1$. This estimate is called a "soft" estimate because it can take on any real value despite the knowledge that the true un-normalized $W_k$ is either $+0.5N_kA_P$ or $-0.5N_kA_P$. This estimate is reasonable because the $+1/-1$ values of the P[ ] and D[ ] signals cause the products of the P[ ] and $D_k$ replicas in Eq. (3) with the true P[ ] and D[ ] signals in the received samples $y(t_j)$ to equal 1. Similarly, the product of the sin $[\omega_{L1}t_j-\phi(t_j)]$ replica in Eq. (3) with the true sin $[\omega_{L1}t_j-\phi(t_j)]$ term in the $y(t_j)$ samples equals $0.5\{1-\cos[2\omega_{L1}t_j-2\phi(t_j)]\}$, and the latter term in this expression averages nearly to zero in the summation of Eq. (3). The C/A code term in the $y(t_j)$ samples contributes negligibly to the Eq. (3) sum because the product of the sin $[\omega_{L1}t_j-\phi(t_j)]$ replica with the cos $[\omega_{L1}t_j-\phi(t_j)]$ term in the $y(t_j)$ samples equals 0.5 sin $[2\omega_{L1}t_j-2\phi(t_j)]$, and this terms averages nearly to zero in the sum. The calculation in Eq. (3), or one that is functionally equivalent, is implemented in dual-frequency civilian GPS receivers that use semi-codeless techniques and the process that is called "Soft-Decision Z-Tracking". Other receivers may implement a calculation similar to Eq. (3).

In one embodiment, the RF front-end of UE receiver 25 accepts the full 20 MHz bandwidth of the P(Y) code. Other embodiments may use a reduced bandwidth. It is possible to use a bandwidth as low as two MHz, as in some civilian C/A code receivers. In that case, the P[ ] term in Eq. (3) must be modified in order to account for the effects of the narrow-band filter on the P[ ] code. A two MHz RF front-end bandwidth involves the loss of about 6.7 dB of the power in the P(Y) code. This power loss can be compensated by increased gain in the antenna 11, by increased integration time in integrate-and-dump register 27, or by some combination thereof.

Eqs. (1) and (3) can be used to develop a model of how $W_{estk}$ is related to the true value of this encryption bit, $W_{truek}$. If the C/A code DLL and PLL errors are negligible, then this model takes the form:

$$W_{estk} = \frac{1}{2} N_k A_P W_{truek} + n_{Wk} \quad (4)$$

where $n_{Wk}$ is a Gaussian random error with a mean of zero and with a standard deviation of $$\sigma_{Wk} = \sigma_n \sqrt{\frac{N_k}{2}} \quad (5)$$

Referring to FIG. 2, Eq. (3) can use estimates of $W_{truek}$ produced by antenna array 11, which can be used to make $C/N_0$ be very large so that $2\sigma_{Wk}/(N_kA_P)=1/\sqrt{2(C/N_0)\Delta t_{Wk}}$ is very small compared to 1. If $2\sigma_{Wk}/(N_kA_P)$ is desired to be no greater than $1/7$, then $C/N_0$ should be no less than $1.25\times10^7$ Hz or 71.0 dB-Hz. This implies that the needed antenna gain would be about thirty dB for typical received P(Y) power levels and typical noise power spectral densities. This level of gain implies that the needed array might consist of about 500 patch antennas, each with a minimum gain of 3 dB in its field of view. A smaller array could be used if some degree of estimation error were acceptable, in which case the integration time in integrate-and-dump register 27 could be increased in order to compensate for the resulting $W_{truek}$ estimation errors.

If $2\sigma_{Wk}/(N_kA_P)\leq 1/7$, the true W bit can be estimated as follows:

$$W_{truek} = \text{sign}(W_{estk}) \quad (6)$$

where sign( ) is the usual function that evaluates to +1 if its input argument is positive and to −1 if its input argument is negative. The probability of getting an erroneous $W_{truek}$ is less than $1.3\times10^{-12}$, which is effectively zero.

Continuing to refer to FIG. 2, UE receiver 25 can implement the processing in Eq. (3) in order to compute $W_{estk}$ 35. Mixer 47 mixes a sequence of $W_{estk}$ 35 with a sequence of $W_{truek}$ 37 values from ground infrastructure 51 in order to compute the following detection statistic:

$$\gamma = \sqrt{\frac{2}{N_\gamma \sigma_n^2}} \left[ \sum_{k=k_0}^{k_0+K-1} W_{truek} W_{estk} \right] \quad (7)$$

where $k_0$ is the initial W-bit index of the sequence that is used to test for spoofing, K is the total number of W bits in the sequence, and $$N_\gamma = \sum_{k=k_0}^{k_0+K-1} N_k \quad (8)$$

is the total number of samples of Eq. (1) in the entire sequence.

Equations (4), (5), (7), and (8) and the carrier-to-noise ratio model after Eq. (1) can be combined to develop the following model of the $\gamma$ statistic:

$$\gamma = \frac{A_P}{\sigma_n} \sqrt{\frac{N_\gamma}{2}} + \nu = \sqrt{2(C/N_0)\Delta t_\gamma} + \nu \quad (9)$$

where $\Delta t_\gamma = N_\gamma \Delta t$ is the total time duration of the entire sequence and where $\nu$ is a sample from a Gaussian distribution with a mean of 0 and a standard deviation of 1.

The model of $\gamma$ in Eq. (9) can be used to develop a threshold test in order to check for spoofing. If the threshold value is $\gamma_{sp}$, the received signal is assumed to have been spoofed if $\gamma \leq \gamma_{sp}$, and the received signal is assumed to be valid if $\gamma_{sp} < \gamma$. The first term on the right-hand side of Eq. (9), if present, biases the $\gamma$ distribution in the positive direction. This term is present only if the true W bits are in the $y(t_j)$ signal, which will be the case only if the signal is not being spoofed. If $\Delta t_\gamma$ is large enough, i.e., if the sequence of considered W bits is long enough, then the first term will be large enough to bias the distribution so that almost all of it lies above $\gamma_{sp}$. In this situation, the system will almost always rightly conclude that spoofing has not occurred. Conversely, if spoofing has occurred, then the true W bits will not be present, which is equivalent to saying that the P(Y) signal's amplitude is $A_P=0$. This will eliminate the bias term in the y distribution. If $\gamma_{sp}$ is set high enough, then most of the γ distribution will lie below this threshold in this situation, and the system will almost always rightly conclude that the signal has been spoofed.

The selection of the $\gamma_{sp}$ threshold value is determined by consideration of the probabilities of two types of error. One type of error is to conclude that the signal has not been spoofed when it has been spoofed. This probability is $$P_{MD} = \frac{1}{\sqrt{2\pi}} \int_{\gamma_{sp}}^{\infty} e^{-v^2/2} dv \qquad (10)$$

The subscript on this probability stands for "Missed Detection" to indicate that a spoofing attack has not been detected. The other type is error is to conclude that spoofing has occurred even though there has been no spoofing. The probability of this type of error is $$P_{FA} = \frac{1}{\sqrt{2\pi}} \int_{-\infty}^{\gamma_{sp}-\sqrt{2(C/N_0)\Delta t_\gamma}} e^{-v^2/2} dv \qquad (11)$$

The subscript of this probability denotes a "False Alarm" in which the threshold test mistakenly indicates the presence of a spoofing signal when no such signal is present.

The threshold can be determined by choosing a small probability of missed detection and computing the threshold $\gamma_{sp}$ by solving Eq. (10) for the threshold value that yields the desired $P_{MD}$ value. The "norminv" inverse cumulative Gaussian distribution function in the stats toolbox from MATLAB® can be used for this computation, for example. The calculation takes the form:

$$\gamma_{sp} = -\text{norminv}(P_{MD}, 0, 1) \qquad (12)$$

The even nature of the zero-mean, unit-variance Gaussian distribution is exploited in this calculation.

The detection threshold $\gamma_{sp}$ and the corresponding probability of a missed detection $P_{MD}$ can be used to compute the probability of a false alarm in Eq. (11) that depends on the carrier-to-noise ratio of the signal. If $C/N_0$ is too low for the given length of the W-bits detection segment $\Delta t_\gamma$, then the probability of a false alarm will be high.

A receiver can take corrective actions if its $P_{FA}$ is too large. The value of $C/N_0$ for the C/A code can be determined by a receiver based on calculations involving in-phase and quadrature accumulations. $C/N_0$ for the P(Y) code can equal a value approximately 2 to 3 dB lower than $C/N_0$ for the C/A code. Therefore, a receiver can get a reasonable estimate of $C/N_0$ for the P(Y) code based on the measured $C/N_0$ for the C/A code. The receiver can use this estimate in Eq. (11) in order to calculate its probability of falsely concluding that the signal has been spoofed. If $P_{FA}$ is too large, then the receiver may decide to average the results of several W-bit sequences in order to make a more reliable determination of whether or not spoofing has occurred.

For example, for an embodiment with $C/N_0=45$ dB-Hz for the P(Y) code, a detection sequence duration of $\Delta t_\gamma=0.001$ sec, which translates into K=480 W bits, and a chosen probability of missed detection $P_{MD}=3\times10^{-5}$, then $\gamma_{sp}=4.01$ according to the Eq. (12) solution of Eq. (10). The probability of a false spoofing alarm from Eq. (11) is then $P_{FA}=4\times10^{-5}$. This situation assumes a C/A code $C/N_0$ value of about 47-48 dB-Hz, which is typical or even conservative in a receiver with a low noise figure.

Referring again to FIG. 2, if one such detection were to be performed per satellite per second for a 12-channel receiver, then the receiver would need to receive 5760 $W_{truek}$ bits per second from ground infrastructure 51. If system 100 supported weaker signals, simultaneous reductions in $P_{MD}$ and $P_{FA}$, or both, the length of the W bits spoofing detection interval $\Delta t_\gamma$ would need to increase. Such an increase could increase the needed communications bandwidth from ground infrastructure 51 to UE receiver 31. If the needed extra bandwidth were not available, then UE receiver 31 could be forced to decrease the frequency with which it computed a spoofing detection statistic for each receiver channel.

A second embodiment of the present teachings can use an encrypted Galileo BOC code or GPS M code instead of the W bits of P(Y) code. The GPS military M code and the Galileo E1A code are both encrypted BOC signals. Their relationship to an unencrypted signal on the same carrier frequency can be characterized by the following modified version of Eq. (1):

$$\gamma(t_j) = A_O O[t_j - \tau(t_j)] \cos[\omega_L t_j - \phi(t_j)] + A_E B[t_j - \tau(t_j)] E[t_j - \tau(t_j)] \cos[\omega_L t_j - \phi(t_j) - \Delta\phi_{EO}] + n(t_j) \qquad (13)$$

where all definitions in Eq. (13) are the same as those in Eq. (1) except that $A_O$ is the amplitude of the unencrypted part of the signal, O[ ] is the unencrypted PRN code, possibly with navigation data bits modulated onto it—the "O" stands for Open source, $W_L$, is the nominal carrier frequency, $A_E$ is the amplitude of the encrypted BOC signal, B[ ] is the known BOC square wave, E[ ] is the unknown encrypted PRN code part of the BOC signal—the "E" stands for Encrypted, and $\Delta\phi_{EO}$ is the known carrier phase difference between the encrypted and unencrypted signals. In the case of the GPS L1 signal, O[ ]=C[ ]D[ ] as in Eq. (1) and B[ ]E[ ] in Eq. (13) constitutes the BOC(10,5) M code. In the case of the Galileo L1 signal, the open-source signal O[ ]=E1B[ ]D[ ]−E1C[ ], with E1B[ ] being an unencrypted data-carrying BOC(1,1) code, D[ ] being a low-frequency data bit stream, and E1C[ ] being an unencrypted dataless pilot BOC(1,1) code. Galileo's encrypted E1 signal is the BOC(15,2.5) signal E1A[ ]=B[ ]E[ ].

Figure 3:
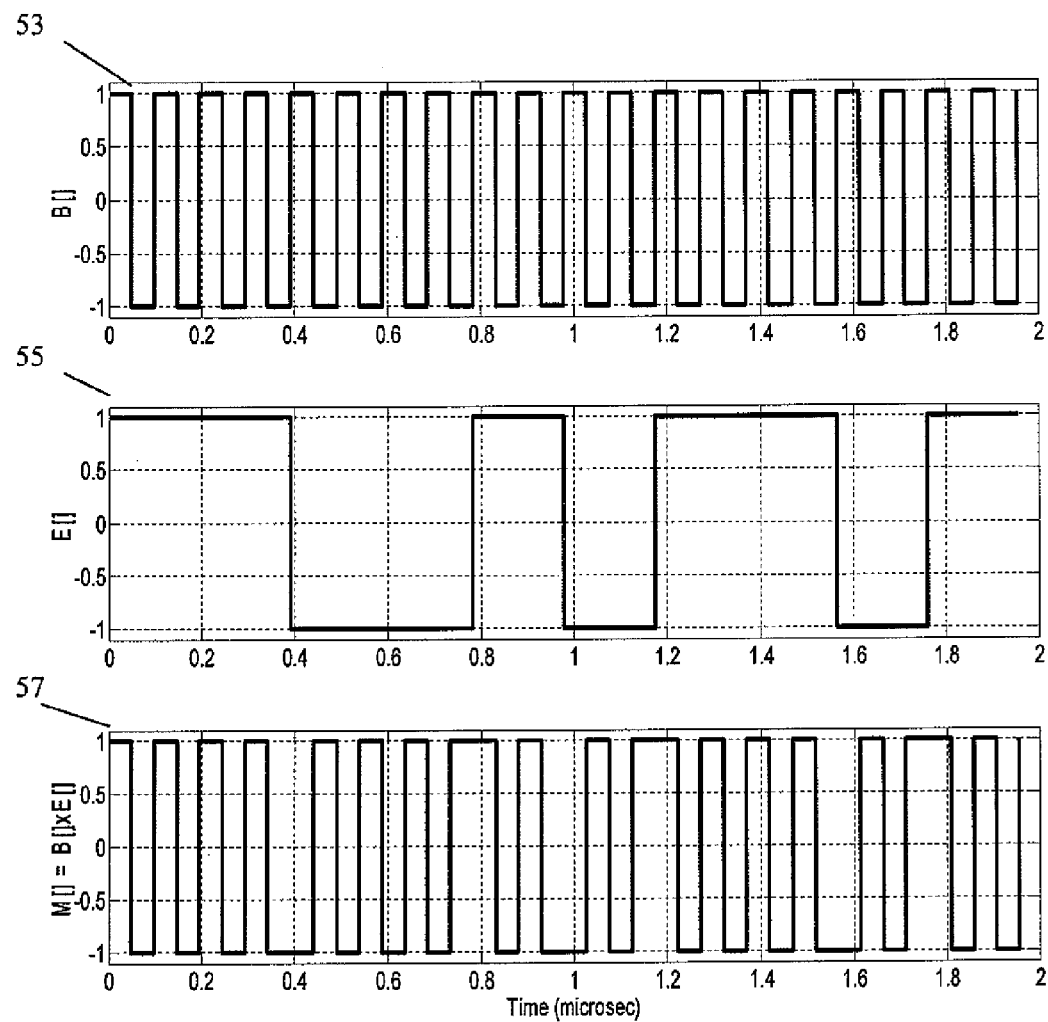
FIG. 3 is a graphical depiction of example segments of BOC(10,5) M-code and its B[ ] and E[ ] components.

Referring now to FIG. 3, the binary offset carrier B[ ] of a BOC(M,N) signal is a square wave with a frequency equal to M×1.023 MHz. It oscillates between the values +1/−1. The PRN code part of the BOC signal, E[ ], is a standard +1/−1 PRN code that chips at the frequency N×1.023 MHz. Short durations of a BOC(10,5) signal and its components are shown in FIG. 3. B[ ] plot 53 depicts the 10.23 MHz binary offset carrier B[ ], E[ ] plot 55 depicts the PRN code E[ ], and the product plot 57 depicts BOC(10,5) product of B[ ] and E[ ]. Note that the phase relationship of the B[ ] binary offset carrier signal can vary relative to the possible bit transition times of the E[ ] PRN code. In FIG. 3, the bit transitions in E[ ] occur during −1 to +1 transitions of the B[ ] signal, which represents only one of many possibilities.

The present embodiment requires that this phase relationship be known, and also the carrier and code phase relationships between the unencrypted and encrypted signals in Eq. (13) should be known. In other words, in the present embodiment the carrier phase offset $\Delta\phi_{EO}$ and the phase relationship between possible +1/−1 transition times in the O[ ] signal and the corresponding transition times in the B[ ] and E[ ] signals are needed. These phase relationships can be determined by studying actual broadcast signals using a high-gain antenna.

Given a signal with an unencrypted O[ ] code and an encrypted B[ ]E[ ] BOC code and given known carrier and code phase relationships between these signal components, the spoofing detection techniques previously described can be modified and applied to this signal. The unencrypted O[ ]

code can be used to track the signal via standard DLL and PLL feedback loops. The known BOC signal B[ ] can be used as though it were the known P[ ] signal previously described, and the encrypted E[ ] signal can be dealt with as though it were the W[ ] signal previously described. The O[ ] signal can be used to form accurate estimates of the code delay $\tau(t_j)$ and the beat carrier phase $\phi(t_j)$. These signals can be used to construct the B[ ] binary offset carrier replica and the cos $[\omega_L t_j - \phi(t_j) - \Delta\phi_{EO}]$ carrier replica. The code phase $\tau(t_j)$ is also used to determine the start and stop samples of the $k^{th}$ chip of the E[ ] code, $j_{kmin}$ to $j_{kmax}$. This information is used to compute the following un-normalized "soft" estimate of the $k^{th}$ chip $$E_{estk} = \sum_{j=j_{kmin}}^{j_{kmax}} y(t_j) B[t_j - \tau(t_j)] \cos[\omega_L t_j - \phi(t_j) - \Delta\phi_{EO}] \quad (14)$$

which is similar to the W-bit estimate in Eq. (3). The resulting model of the relationship between this chip estimate and the true chip value is $$E_{estk} = \frac{1}{2} N_k A_E E_{truek} + n_{Ek} \quad (15)$$

which is similar to Eq. (4) except that the model in Eq. (15) may depend partly in the low correlation between B[ ] and O[ ] during the $E_k$ chip interval in order to eliminate any effects from the unencrypted signal in the Eq. (15) model. This latter condition is required if the value of $\Delta\phi_{EO}$ causes the average of the product cos $[\omega_L t_j - \phi(t_j)]$ cos $[\omega_L t_j - \phi(t_j) - \Delta\phi_{EO}] = 0.5$ cos $[2\omega_L t_j - 2\phi(t_j) - \Delta\phi_{EO}] + 0.5$ cos $[\Delta\phi_{EO}]$ to be significantly different from zero. Given that this average will be very near to 0.5 cos $[\Delta\phi_{EO}]$ in most cases, the new condition applies whenever cos $[\Delta\phi_{EO}] \neq 0$, which is the case for GPS M code relative to C/A code but not for Galileo E1A code relative to E1B and E1C code.

Given Eq. (14) and the model in Eq. (15), the methods and results previously described carry forward to the case of using an encrypted BOC signal to detect spoofing of a phase coherent unencrypted signal. A difference is that the system processes $E_k$ chips instead of $W_k$ bits in order to compute the required spoofing detection statistic. A difference when using encrypted GPS M code or encrypted Galileo E1A code for purposes of spoofing detection is the difference between the chip periods of the E[ ] signals of the two encrypted codes, and the bit period of the P(Y) code's W[ ] bits. The nominal chip period is 5.33 times shorter for the Galileo E1A code and 10.66 times shorter for the GPS M code. This difference can cause K, the number of chips or bits used for a spoofing detection interval $\Delta t_y$, to increase in order to keep $\Delta t_y$ constant. This difference can cause a commensurate increase in the needed communication bandwidth between ground-based infrastructure 51 and UE 23. Thus, the use of M code to do spoofing detection implies that $10.66 \times 5760 = 61402$ $E_{truek}$ bits per second would need to be transmitted in order to enable spoofing detection on twelve channels using a 0.001 second detection interval once every second.

In order to base spoofing detection on GPS M code or Galileo E1A code instead of GPS P(Y) code, at least one modification to the previously-described system is required. This modification relates to the increased rate of the unknown E[ ] chips. The increased chipping rate decreases the length of the accumulation interval used for estimating each $E_k$ chip, thereby decreasing its signal-to-noise ratio. This decreased signal-to-noise ratio (SNR) must be compensated in ground infrastructure 51 in order to ensure the validity of the calculation $E_{truek} = \text{sign}(E_{estk})$, as in Eq. (6). To counteract this decrease in the SNR, the noise figure of the RF front ends of antenna array 11 can be improved, or the gain of antenna array 11 can be increased. If the latter approach is used, then a GPS-M-code-based system could require 10.66 times as many patch antennas in its ground-based array as would a P(Y)-code-based system. A Galileo E1A-based system could require 5.33 times as many patch antennas. Alternatively, a system could decide to accept a higher probability of wrong determination of E[ ] chips using antenna 11, and the system could compensate for this increased uncertainty by integrating longer in integrate-and-dump register 27.

Other encrypted signals could be used to detect spoofing, not limited to encrypted BOC signals. An equivalent method could be developed for the detection of spoofing on any unencrypted signal that had known carrier- and code-phase relationships to an encrypted signal. Also, the desired segments of the unknown bits/chips could be provided, eliminating the need for antenna 11. The segments of the encryption bits/chips can be provided after a short delay, thereby ensuring that this information could not be used to partially spoof its encrypted signal.

Figure 4:
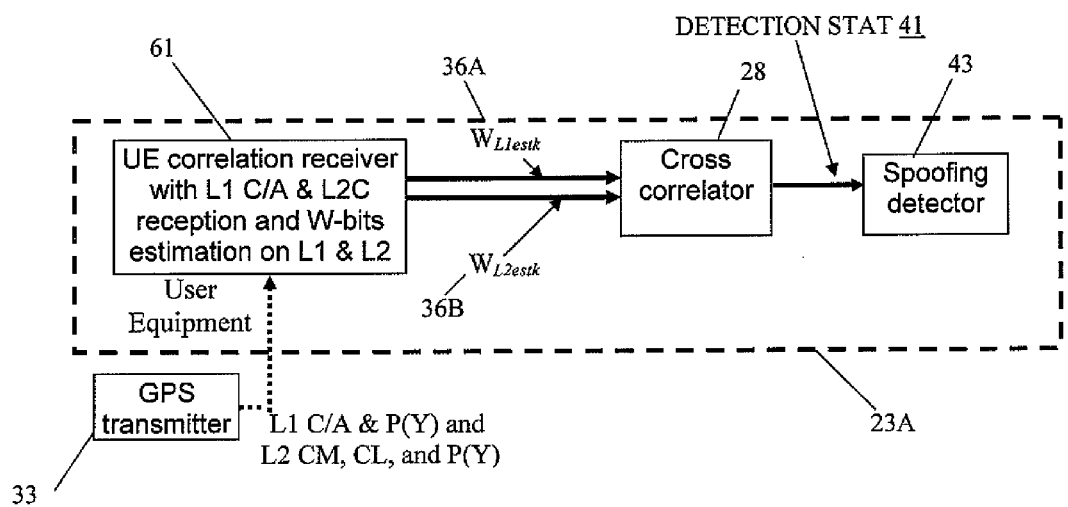
FIG. 4 is a schematic block diagram of the signal processing associated with another embodiment of the present teachings.

Referring now to FIG. 4, a third embodiment of the present teachings cross-correlates the W bits from the L1 and L2 frequencies of a GPS signal when an unencrypted civilian signal is transmitted and received on the L2 frequency. In this embodiment, the P(Y) code is the same on the L1 and L2 signals, and it has a known carrier- and code-phase relationship to the unencrypted C/A code on L1 and to the unencrypted civil-moderate (CM) and civil-long (CL) codes on L2. In this embodiment, correlation user equipment 23A computes estimates of the unknown W bits, $W_{L1estk}$ 36A and $W_{L2estk}$ 36B using the signals at both frequencies. These W bits estimates can be mixed and then summed in an integrate-and-dump register within cross correlator 28. The resulting output detection statistic 41 can be input to spoofing detector 43 to assess whether one or both signals have been spoofed. Further, this embodiment does not require ground infrastructure 51 (FIG. 2) or UE receiver 31 (FIG. 2) for receiving an aiding signal. In this embodiment, there could be a higher probability of spoofing than in the previously-described embodiments. UE correlation receiver 61 can perform the same functions for the L1 signal up through the calculation of the $W_{estk}$ bits in Eq. (3), referred to in this embodiment as $W_{L1estk}$ bits. UE correlation receiver 61 can perform similar operations for its L2 signal except that the estimates of $\tau(t_j)$ and $\phi(t_j)$ for the L2 signal are derived by a DLL and a PLL to track the CM or CL signal on L2 (or to track both). The estimates of $D[t_j - \tau(t_j)]$ on L2 may come from, for example, the L1 processing or from the CM signal on L2, depending on which set of navigation data bits are being transmitted on the L2 CM signal. Given the necessary L2 versions of $\tau(t_j)$, $\phi(t_j)$, and $D[t_j - \tau(t_j)]$, an L2 version of Eq. (3) can be implemented in order to form the L2 W-bit estimates $W_{L2estk}$. This calculation uses $\omega_{L2} = 2\pi \times 1227.6 \times 10^6$ rad/sec in place of $\omega_{L1}$ in its carrier mixing term.

The spoofing detection decision can use the statistic $$\beta = 2 \sum_{k=k_0}^{k_0+K-1} \frac{W_{L1estk} W_{L2estk}}{\sigma_{L1n} \sigma_{L2n} \sqrt{N_{L1k} N_{L2k}}} \quad (16)$$

where $\sigma_{L1n}$ and $\sigma_{L2n}$ are the respective per-sample noise standard deviations in the variants of Eq. (1) that apply at the two frequencies and where $N_{L1k}$ and $N_{L2k}$ are the respective numbers of samples that have been used in the two variants of Eq. (3) in order to compute $W_{L1estk}$ 36A and $W_{L2estk}$ 36B. As described previously, the decision of whether the signal has been spoofed or not is based on a threshold value of $\beta$, referred to herein as $\beta_{sp}$. One or both of the received unencrypted signals, the C/A code on L1 or the CM/CL code on L2, is deemed to have been spoofed if $\beta \leq \beta_{sp}$, and both received unencrypted signals are deemed to be valid if $\beta_{sp} < \beta$. The determination of a threshold value $\beta_{sp}$ can be made by use of a statistical model of $\beta$. An analysis similar to that which has been used to derive Eq. (9) yields the model:

$$\beta = \sum_{k=k_0}^{k_0+K-1} \left[\sqrt{2(C/N_0)_{L1} \Delta t_{Wk}} \, W_{truek} + v_{L1k}\right] \quad (17)$$

$$\left[\sqrt{2(C/N_0)_{L2} \Delta t_{Wk}} \, W_{truek} + v_{L2k}\right]$$

where $(C/N_0)_{L1}$ and $(C/N_0)_{L2}$ are the P(Y) code received carrier-to-noise ratios at the L1 and L2 frequencies and where $v_{L1k}$ and $v_{L2k}$ are samples of independent zero-mean, unit-variance Gaussian white-noise sequences. The accumulation intervals for $W_{L1estk}$ 36A and $W_{L2estk}$ 36B are both $\Delta t_{Wk}$. If K, the number of W bits used to compute $\beta$, is large, then the central limit theorem applies, and the probability distribution of $\beta$ can be approximated by a Gaussian for both the spoofed and un-spoofed cases. It can be possible to use very large values of K for this system because estimates of the W bits need not be received over a radio link. Therefore, the two probability distributions that can be used to design and analyze $\beta_{sp}$ can be characterized by their means and their standard deviations. In the presence of spoofing, the mean and standard deviation of $\beta$ are:

$$E\{\beta \mid \text{spoofing}\} = 0 \quad (18a)$$

$$E\{\beta^2 \mid \text{spoofing}\} = K + \begin{cases} 0 & \text{if both signals are being spoofed} \\ 2(C/N_0)_{L2}\Delta t_\beta & \text{if only the } L1 \text{ signal is being spoofed} \\ 2(C/N_0)_{L1}\Delta t_\beta & \text{if only the } L2 \text{ signal is being spoofed} \end{cases} \quad (18b)$$

where $\Delta t_\beta$ is the total length of time spanned by the K W bits that have been used to compute the statistic in Eq. (16). The following standard deviation of $\beta$ can be used under the assumption of spoofing:

$$\sigma_{\beta s}^2 = K + 2\max[(C/N_0)_{L1}, (C/N_0)_{L2}]\Delta t_\beta \quad (19)$$

where the max[,] function returns the maximum of its two arguments. If neither signal is being spoofed, then the mean and standard deviation of $\beta$ are $$\bar{\beta}_n = E\{\beta \mid \text{no spoofing}\} = 2\sqrt{(C/N_0)_{L1}(C/N_0)_{L2}}\Delta t_\beta \quad (20a)$$

$$\sigma_{\beta n}^2 = E\{(\beta-\bar{\beta}_{ns})^2 \mid \text{no spoofing}\} = K + 2[(C/N_0)_{L1} + (C/N_0)_{L2}]\Delta t_\beta \quad (20b)$$

Given the results in Eqs. (18a), (19), (20a), and (20b) and given the Gaussian assumption, the $\beta_{sp}$ threshold is selected to yield a pre-defined small probability of missed detection of a spoofing incident:

$$P_{MD} = \frac{1}{\sqrt{2\pi}} \int_{\beta_{sp}/\sigma_{\beta s}}^{\infty} e^{-v^2/2} dv \quad (21)$$

Similar to the previously-described embodiments, this equation can be solved for $\beta_{sp}$ by using the "norminv" function in the stats toolbox of MATLAB®:

$$\beta_{sp} = -\sigma_{\beta s} \text{norminv}(P_{md}, 0, 1) \quad (22)$$

Given $\beta_{sp}$, the probability of a spoofing false alarm can be computed as $$P_{FA} = \frac{1}{\sqrt{2\pi}} \int_{-\infty}^{(\beta_{sp}-\bar{\beta}_n)/\sigma_{\beta n}} e^{-v^2/2} dv \quad (23)$$

The calculation of $\beta_{sp}$ requires knowledge of $\sigma_{\beta s}$, which is calculated in Eq. (19) based on the values of $(C/N_0)_{L1}$ and $(C/N_0)_{L2}$. The evaluation of $P_{FA}$ also requires knowledge of these two carrier-to-noise ratios. They can be inferred from their L1 C/A code and L2C CM/CL code counterparts, which can be measured by the receiver. This inference makes use of a priori knowledge of the ratio of the P(Y) code power to the civilian code power on both frequencies. This ratio can be deduced, or it can be measured ahead of time for each GPS satellite by using a similarly-equipped receiver in a one-time experiment/analysis campaign that uses the model in Eq. (4) to estimate the $A_P$ values at the two frequencies.

The following is an example of these calculations: Suppose that $(C/N_0)_{L1}=45$ dB-Hz, that $(C/N_0)_{L2}=43.5$ dB-Hz, and that $\Delta t_\beta=0.05$ sec, which translates into K=24000 W bits in the $\beta$ detection statistic. Then $\sigma_{\beta s}=164.8$, $\bar{\beta}_n=2660.7$, and $\sigma_{\beta n}=171.5$. If the chosen probability of missed detection is $P_{MD}=1\times10^{-15}$, then Eq. (22) yields $\beta_{sp}=1308.8$. The probability of a false spoofing alarm is $P_{FA}=1.6\times10^{-15}$. Thus, spoofing can be detected with very low probabilities of missed detection or false alarm.

The processing functions of UE correlation receiver 61 are similar to those that are implemented in a semi-codeless dual-frequency civilian receiver. Differences include the use of the L2C civilian CM/CL codes to track the L2 signal and the use of the W-bits calculations on both frequencies in order to detect spoofing rather than to enable L2 tracking.

Figure 5:
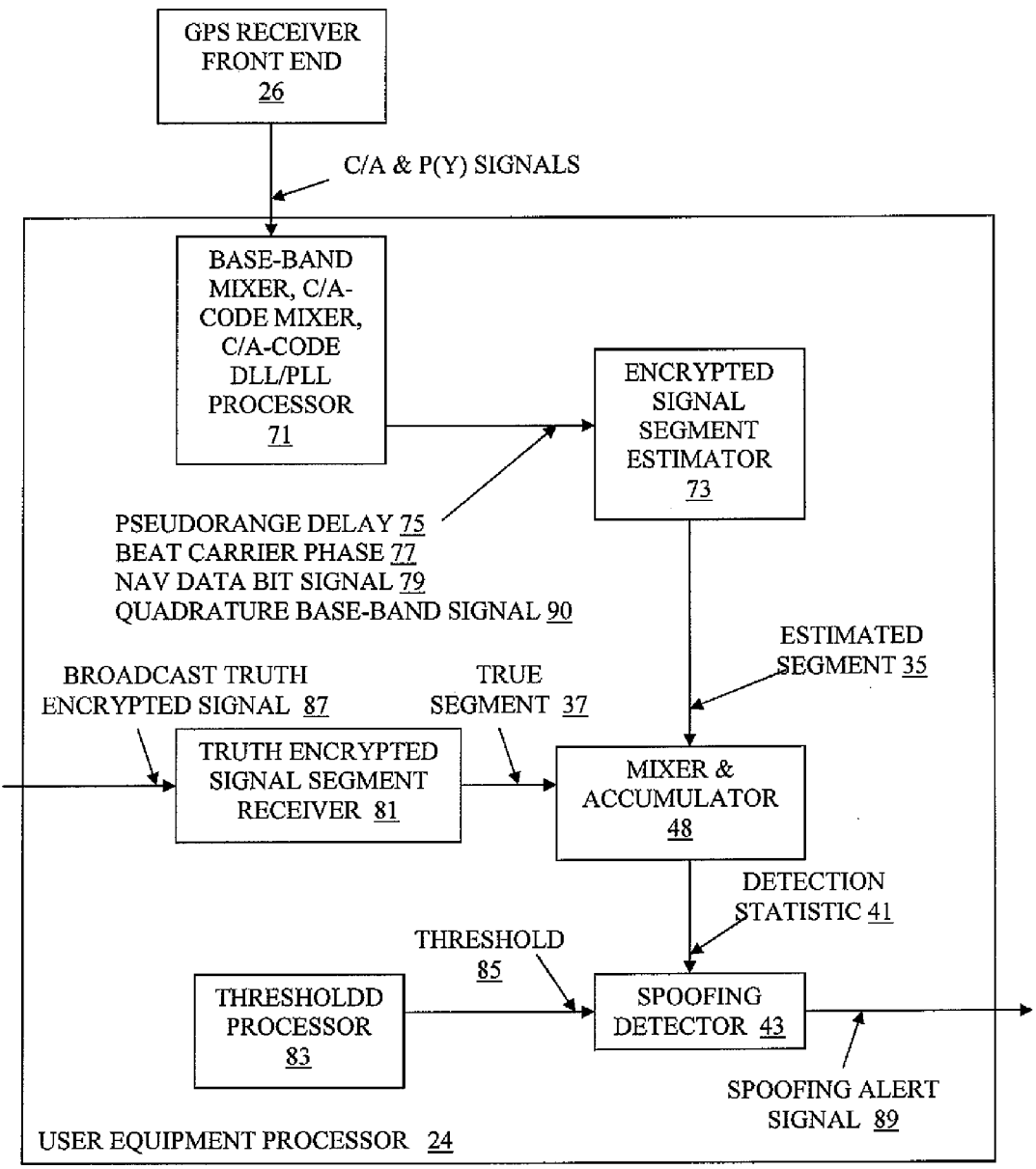
FIG. 5 is a schematic block diagram of an embodiment of the user equipment of the present teachings.

Referring now to FIG. 5, an embodiment of a user equipment processor can include, but is not limited to including, GPS receiver front end 26 configured to receive a GPS signal and transmit a digitized intermediate frequency signal that contains C/A code and P(Y) code to base-band mixer, C/A-code mixer, C/A-code PLL/DLL processor 71 configured to compute pseudorange delay 75, beat carrier phase 77, navigation data bit signal 79, and quadrature base-band signal 90 as described previously. Encrypted signal segment estimator 73 is configured to receive pseudorange delay 75, beat carrier phase 77, navigation data bit signal 79, and quadrature base-band signal 90 and compute, from its inputs, estimated segment 35 according to the methods previously described. User equipment processor can also include truth encrypted signal segment receiver 81 configured to receive digitally-signed broadcast encrypted signal 87 and derive true segment 37 from broadcast encrypted signal 87 as described previously. User equipment processor can still further include threshold processor 83 configured to compute threshold 85 as described previously. Mixer and accumulator 48 can receive estimated segment 35 and true segment 37 and combine them as described above to produce detection statistic 41. Spoofing detector 43 is configured to receive threshold 85 and detection statistic 41, determine if the signal has been spoofed as described previously, and generate spoofing alert signal 89 if spoofing has been detected.

Referring to FIGS. 2 and 5, the method of the present teachings for detecting spoofing of signals can include, but is not limited to including, receiving unencrypted signals and encrypted signals on a first frequency at user equipment 23 (FIG. 2), estimating characteristic features of the encrypted signals in user equipment processor 24 (FIG. 5), receiving true characteristic features at the user equipment 23 (FIG. 2) through a broadcast communications channel that includes a secure digital signature, computing in user equipment processor 24 (FIG. 5) a detection statistic 41 (FIG. 2) based on the estimated characteristic features and the true characteristic features, and comparing by user equipment processor 24 (FIG. 5) the detection statistic 41 (FIG. 2) with a pre-selected threshold 85 (FIG. 5) to detect spoofing of the unencrypted signal. User equipment processor 24 (FIG. 5) can execute a computer program product to accomplish the described steps. The computer program product can be stored on a computer readable medium. The characteristic features can optionally include a segment of GPS P(Y) code W bits. The step of estimating can further optionally include the step of semi-codeless processing of the encrypted signal. The secure digital signature can optionally include private-key encryption and public-key decryption.

Referring again to FIG. 4, an alternative method of the present teachings for detecting spoofing of signals can include, but is not limited to including, the steps of receiving a GNSS signal having a first frequency and a second frequency, the first frequency having first frequency encrypted signals, the second frequency having unencrypted signals and second frequency encrypted signals, the first frequency encrypted signals and the second frequency encrypted signals having like characteristic features, estimating characteristic features of the first frequency and the second frequency, cross-correlating the estimated characteristic features to determine detection statistic 41 (FIG. 4), and comparing detection statistic 41 (FIG. 4) with a pre-selected threshold in a spoofing detector 43 (FIG. 4) to detect spoofing of the unencrypted signals on the two frequencies.

Referring again to FIG. 5, yet another alternative method of the present teachings for detecting spoofing of signals can include, but is not limited to including, the steps of running DLL on an unencrypted signal to produce code pseudorange delay 75, running PLL on the unencrypted signal to produce beat carrier phase 77, using beat carrier phase 77 and a pre-selected carrier phase relationship between the unencrypted signal and the encrypted signal to mix the encrypted signal to baseband, estimating encrypted signal chip transition timing based on DLL code timing from the unencrypted signal. The term "chip" is also referred to as "bit", depending on the signal context. For example, if the quantity is known, for example, to an encrypter or transmitter, it is usually referred to as "chip", and if the quantity is unknown, for example, when received by a civilian receiver, it is usually referred to as "bit", though sometimes as "chip". The terminology "bit/chip" is used herein to denote this quantity. The method can further include the step of estimating encrypted signal chip/bit based on the estimated encrypted signal chip transition timing, the baseband encrypted signal, and pre-selected features of the signal. The pre-selected features can include, but are not limited to including, P-code chips and BOC modulation. The method can further include the steps of mixing estimated bit/chips 35 of the encrypted signal with true bits/chips 37 to compute a detection statistic 41, deriving a spoofing threshold 85, and signaling spoofing of the signal if the detection statistic 41 and the spoofing threshold 85 indicate that spoofing has occurred.

The methods previously described can be, in whole or in part, implemented electronically. Signals representing actions taken by elements of system 100 (FIG. 1) can travel over electronic communications media. Control and data information can be electronically executed and stored on computer-readable media. System 100 (FIG. 1) can be implemented to execute on a node in a communications network. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, an EPROM, a FLASH-EPROM, or any other memory chip or cartridge, a carrier wave, or any other medium from which a computer can read.

Although the invention has been described with respect to various embodiments, it should be realized this invention is also capable of a wide variety of further and other embodiments.

What is claimed is:

1. A method for detecting spoofing of a GNSS, signals comprising:
   receiving unencrypted GNSS signals and encrypted GNSS signals on a first frequency at user equipment;
   estimating encryption sequence features of the encrypted signals; encryption sequence features being estimated from estimates of pseudo-range delay and beat carrier phase obtained from the unencrypted GNSS signals, the encrypted signals, and known carrier and code phase relationship between the encrypted signal and the unencrypted signal; receiving the true characteristic features at the user equipment through a broadcast communications channel that includes a secure digital signature;
   computing a detection statistic based on the estimated encryption sequence features and the true encryption sequence features; and
   comparing the detection statistic with a pre-selected threshold to detect spoofing of the unencrypted signal.

2. The method as in claim 1 wherein the encryption sequence features comprise a segment of GPS P(Y) code W bits.

3. The method as in claim 1 wherein said step of estimating further comprises the step of:
   semi-codeless processing of the encrypted signal.

4. The method as in claim 1 wherein the secure digital signature comprises private-key encryption and public-key decryption.

5. A computer program product for carrying out the steps of the method of claim 1; said computer program product comprising a non-transitory computer readable medium.

6. A non-transitory computer readable medium having instructions for carrying out the steps of the method of claim 1.

7. A system for detecting spoofing of signals comprising:
   a receiver receiving encrypted and unencrypted signals, said receiver deriving an estimated segment of encryption sequence features from the received encrypted signal; encryption sequence features being estimated from estimates of pseudo-range delay and beat carrier phase obtained from the unencrypted signals, the encrypted signals and known carrier and code phase relationship between the encrypted signal and the unencrypted signals; an antenna receiving encrypted and unencrypted signals, said antenna deriving a substantially true segment of the signal characteristic features from the received encrypted signal;

a digital signer encrypting the substantially true segment with private key encryption;

a secure uplink and broadcast transceiver for transmitting the digitally signed substantially true segment a truth data receiver receiving the digitally signed substantially true segment;

a public key decrypter verifying the digital signature of substantially true segment to authenticate it;

a mixer mixing the decrypted substantially true segment with the estimated segment;

an integrate-and-dump register calculating a detection statistic from the mixed segments; and a spoofing detector comparing the detection statistic with a threshold to detect spoofing of the received signal.

8. The system as in claim 7 wherein said encryption sequence features comprise W-bits of GPS P(Y) code.

9. The system as in claim 7 wherein said encryption sequence features comprise GPS M code chips.

10. The system as in claim 7 wherein said encryption sequence features comprise Galileo E1A code chips.

11. The system as in claim 7 wherein said unencrypted signal comprises GPS C/A code on the L1 frequency.

12. The system as in claim 7 wherein said unencrypted signal comprises Galileo E1B and E1C codes on the L1 frequency.

13. The system as in claim 7 wherein said unencrypted signal comprises UPS L2 CL code on the L2 frequency.

14. The system as in claim 7 wherein said encrypted signal comprises GPS P(Y) code on the L1 frequency.

15. The system as in claim 7 wherein said encrypted signal comprises UPS P(Y) code on the L2 frequency.

16. The system as in claim 7 wherein said encrypted signal comprises GPS M code on the L1 frequency.

17. The system as in claim 7 wherein said encrypted signal comprises UPS M code on the L2 frequency.

18. The system as in claim 7 wherein said encrypted signal comprises Galileo E1A code on the L1 frequency.

19. A method for detecting spoofing of signals comprising:
receiving a GNSS signal having a first frequency and a second frequency, the first frequency having unencrypted signals and first frequency encrypted signals, the second frequency having unencrypted signals and second frequency encrypted signals, the first frequency encrypted signals and the second frequency encrypted signals having like encryption sequence features; estimating the encryption sequence features of the first frequency and the second frequency; encryption sequence features of respective frequencies being estimated from estimates of pseudo-range delay and beat carrier phase obtained from unencrypted signals of the respective frequencies, encrypted signals of the respective frequencies, and known carrier and code phase relationship between the encrypted signal of the respective frequencies and the unencrypted signal of the respective frequencies;

cross-correlating the estimated encryption sequence features from the first frequency and the second frequency to determine a detection statistic; and comparing the detection statistic with a pre-selected threshold to detect spoofing of the unencrypted signals on the two frequencies.

20. A method for detecting spoofing of signals comprising the steps of:
running DLL on an unencrypted signal to produce a code pseudo-range delay;

running PLL on the unencrypted signal to produce a beat carrier phase;

estimating encryption sequence bit/chip transition timing;

estimating encryption sequence bit/chip values based on the estimated encrypted signal bit/chip transition timing, the baseband encrypted signal, and pre-selected known features of the encrypted signal;

mixing the estimated encryption sequence bit/chip values with substantially true encryption sequence bits/chips to compute a detection statistic;

deriving a spoofing threshold; and signaling spoofing of the signal if the detection statistic and the spoofing threshold indicate that spoofing has occurred.

* * * * *

UNITED STATES PATENT AND TRADEMARK OFFICE
CERTIFICATE OF CORRECTION

PATENT NO. : 8,712,051 B2
APPLICATION NO. : 13/255984
DATED : April 29, 2014
INVENTOR(S) : John Meschter et al.

It is certified that error appears in the above-identified patent and that said Letters Patent is hereby corrected as shown below:

In the Claims

In column 16, line 25 (claim 1), "of a GNSS, signals" should read -- of GNSS signals --

In column 16, line 45 (claim 2), "bits," should read -- bits. --

In column 17, line 36 (claim 15), "UPS P(Y) code" should read -- GPS P(Y) code --

In column 17, line 40 (claim 17), "UPS M code" should read -- GPS M code --

In column 18, line 27 (claim 20), "psuedo-range" should read -- psuedorange --

Signed and Sealed this
Eighth Day of July, 2014

Michelle K. Lee
*Deputy Director of the United States Patent and Trademark Office*